(No Model.)

M. VIRNOCHE.
SAD IRON.

No. 339,247. Patented Apr. 6, 1886.

Witnesses
S. A. Owen
B. J. Burns

Inventor
Maxime Virnoche
By his Att'y,
Alphonso B. Smith

UNITED STATES PATENT OFFICE.

MAXIME VIRNOCHE, OF SAN FRANCISCO, CALIFORNIA.

SAD-IRON.

SPECIFICATION forming part of Letters Patent No. 339,247, dated April 6, 1886.

Application filed December 16, 1884. Serial No. 150,520. (No model.)

*To all whom it may concern:*

Be it known that I, MAXIME VIRNOCHE, a citizen of the United States, residing in the city and county of San Francisco, State of California, have invented an Improved Heat-Indicating Attachment to Sad-Irons; and I do hereby declare that the following is a full, clear, and exact description of my said improvement, reference being had to the accompanying drawings.

The object of my invention is to provide an indicator upon sad-irons and other like implements for laundry, hatters', and tailors' use to show the degree of heat acquired by the article when on the fire or during the operation of imparting the required temperature to it.

To such end and purpose my improvement consists in attaching to and combining with the iron a temperature-indicator, having a suitable scale for reading the degrees of heat.

This indicator has the form and character of the ordinary thermometer, and provision is made for attaching it either permanently to the iron or in such manner that it can be loosened or detached and taken off.

The following description fully explains the manner in which I apply and attach such an indicator, the drawings being referred to by figures and letters.

Figure 1:
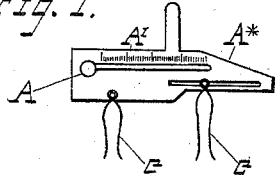
Figure 2:
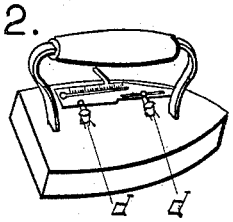
Figure 3:
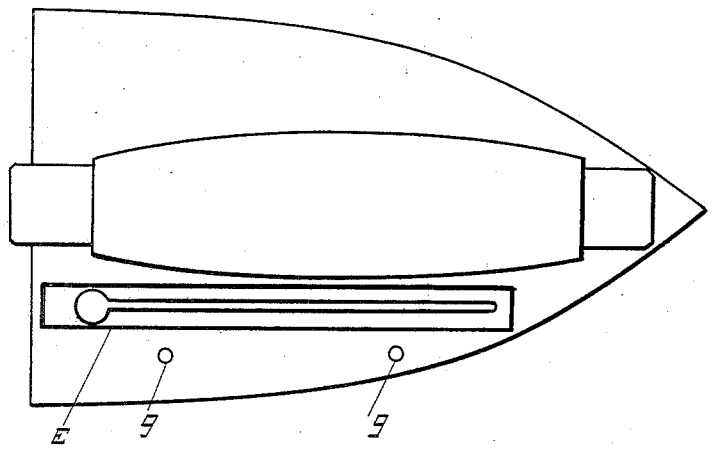
Figure 4:
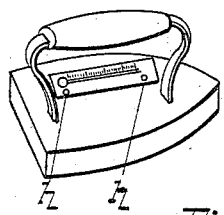
Figure 6:
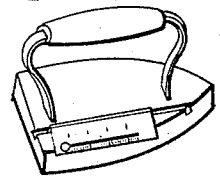
Figure 5:
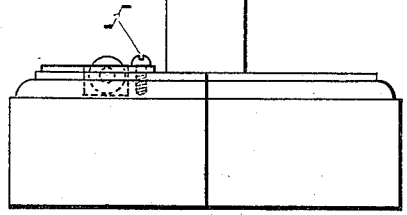
Figure 7:
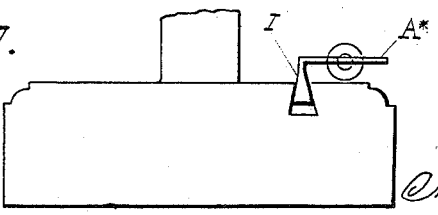

Figure 1 shows one form of the indicator, designed to be readily attached and removed at pleasure, and Fig. 2 its position when applied. Fig. 3 illustrates the manner of permanently fixing the indicator by providing a cavity or recess in the back of the iron to receive the thermometer and its scale. Fig. 4 shows this application. Fig. 5 is a front elevation of Fig. 3 with the thermometer fixed by screws. Figs. 6 and 7 illustrate a mode of attaching the thermometer so that it can be easily removed and replaced.

The thermometer can be of any suitable construction, but not of any great range of action, as only the higher degrees of temperature are necessary to be indicated. In the manner of attaching it (shown in Figs. 1 and 2) the tube A is secured, in the usual way of fastening thermometer-tubes to plates, on a plate, A*, having the usual divisions, A', and the plate is provided with a tongue, $b$, that is to be bent over the edge of the iron and bent down flat against its face. The opposite side of the plate has wire catches or hooks C C, and on the back of the iron there are small studs or knobs $d\ d$, around which the catches are bent when the plate A* is laid flat upon the iron. To apply it permanently, I provide a cavity or recess, E, in the back of the iron, and then fix the plate by means of screws $f$, that take into holes $g\ g$ in the iron. Figs. 3 and 5 of the drawings show this mode of applying the thermometer.

Fig. 4 shows the plate fixed directly upon the back of the iron by screws or other fastenings $h\ h$, without any cavity or depression.

Another mode of attaching the indicator is to make a dovetail slot in the back of the iron from front to rear, and then provide a tongue or rib, I, on the scale-plate A* to fit this slot.

Such device will enable the required temperature of the iron to be accurately determined at any time while it is undergoing the heating operation, will be found of great advantage both in saving time, in dispensing with imperfect tests and experiments now resorted to, and in preventing damage to the articles operated on from the use of excessive temperature in the iron.

Having thus fully described my invention, what I claim, and desire to secure by Letters Patent, is—

1. The combination, with the sad-iron, of a detachable thermometer secured thereupon in the manner set forth.

2. The combination, with the sad-iron having the studs $d\ d$, of a thermometer, A, and plate A', having the flexible metallic tongue or extension $b$, and wires C C, secured to the plate A', substantially as and for the purpose set forth.

In testimony whereof I have hereunto subscribed my name this 13th day of October, A. D. 1884.

MAXIME VIRNOCHE. [L. S.]

Witnesses:
J. B. CUMMING,
A. B. SMITH.